US009733028B2

United States Patent
Scott et al.

(10) Patent No.: US 9,733,028 B2
(45) Date of Patent: Aug. 15, 2017

(54) BYPASS VALVE WITH A HOLLOW SHAFT AND A MEMORY METAL ALLOY SPRING

(71) Applicant: HS Marston Aerospace Ltd., Wolverhampton (GB)

(72) Inventors: David Russell Scott, Walsall (GB); Sean L. Cameron, West Midlands (GB)

(73) Assignee: HS MARSTON AEROSPACE LTD., Wolverhampton (GB)

( * ) Notice: Subject to any disclaimer, the term of this patent is extended or adjusted under 35 U.S.C. 154(b) by 663 days.

(21) Appl. No.: 13/864,822

(22) Filed: Apr. 17, 2013

(65) Prior Publication Data
US 2013/0277039 A1 Oct. 24, 2013

(30) Foreign Application Priority Data

Apr. 18, 2012 (GB) .................................. 1206826.8

(51) Int. Cl.
*G05D 23/12* (2006.01)
*F28F 27/00* (2006.01)
(Continued)

(52) U.S. Cl.
CPC ............ *F28F 27/00* (2013.01); *F16K 31/002* (2013.01); *F28F 27/02* (2013.01); *F28F 2250/06* (2013.01);
(Continued)

(58) Field of Classification Search
CPC ......... F28F 27/00; F28F 27/02; F16K 31/002; Y10T 137/7737; Y10T 137/0324
(Continued)

(56) References Cited

U.S. PATENT DOCUMENTS 4,265,267 A * 5/1981 Cyphelly ................ F04C 14/26
137/115.05
4,522,219 A * 6/1985 Ohkata ..................... E03B 7/12
116/218
(Continued)

FOREIGN PATENT DOCUMENTS

EP 0443416 A1 8/1991
EP 2444703 A1 4/2012

OTHER PUBLICATIONS

Combined Search and Examination Report under Sections 17 and 18(3) for application No. GB1206826.8, Mailed May 4, 2012, 6 pages.
(Continued)

*Primary Examiner* — Ljiljana Ciric
(74) *Attorney, Agent, or Firm* — Cantor Colburn LLP (57) ABSTRACT

A valve includes an outer structure. The valve includes a hollow shaft that includes holes formed therein, the shaft disposed within the outer structure and translatable from a first position to a second position. A memory metal alloy (MMA) spring is coupled to the shaft and the outer structure, the MMA spring expanding and moving the shaft from the first position to the second position in response to a temperature of a fluid. A valve head is coupled to the shaft and adapted to be biased within the outer structure, the valve head closing a bypass inlet in the first position and allowing fluid to enter the bypass inlet in the second position, and transferring fluid from the bypass inlet into the hollow shaft so that the fluid can exit the valve via an outlet. A pressure relief mechanism may be included.

6 Claims, 10 Drawing Sheets

(51) Int. Cl.
*F16K 31/00* (2006.01)
*F28F 27/02* (2006.01)

(52) U.S. Cl.
CPC .... *Y10T 137/0324* (2015.04); *Y10T 137/7737* (2015.04)

(58) Field of Classification Search
USPC ..................................................... 236/101 R
See application file for complete search history.

(56) References Cited

U.S. PATENT DOCUMENTS

| | | | | | |
|---|---|---|---|---|---|
| 4,523,605 | A | * | 6/1985 | Ohkata | ..................... E03B 7/12 116/218 |
| 4,699,171 | A | * | 10/1987 | Sugden | ............... F16K 17/0473 137/468 |
| 4,783,271 | A | * | 11/1988 | Silverwater | ............ B01D 29/15 210/149 |
| 5,261,597 | A | * | 11/1993 | Perlman | ............. G05D 23/1333 236/101 D |
| 5,803,354 | A | * | 9/1998 | Benedict | .............. G05D 23/134 236/101 D |
| 5,878,949 | A | * | 3/1999 | Matsui | ................. G05D 23/025 137/509 |
| 6,098,661 | A | * | 8/2000 | Yim | ...................... F16K 11/052 137/875 |
| 7,540,431 | B2 | * | 6/2009 | Kozdras | ............. G05D 23/1333 137/535 |
| 8,353,462 | B2 | * | 1/2013 | Todaka | .................... F16K 11/07 236/101 A |
| 9,212,754 | B2 | * | 12/2015 | Jackson, Jr. | .......... F16K 17/386 |
| 9,376,947 | B2 | * | 6/2016 | Abram | ..................... F01N 1/08 |
| D767,101 | S | * | 9/2016 | Kobayashi | ................... D23/249 |
| 2010/0213401 | A1 | * | 8/2010 | Martin | .................. F01M 5/007 251/321 |
| 2010/0288376 | A1 | * | 11/2010 | Haasz | .................... F01D 9/065 137/468 |
| 2012/0090815 | A1 | * | 4/2012 | Cameron | ............. F16K 31/002 165/67 |
| 2014/0263680 | A1 | * | 9/2014 | Jackson, Jr. | .......... F16K 17/386 236/101 R |

OTHER PUBLICATIONS

GB Office Action for Application No. GB1206826.8, Mailed on Jul. 14, 2014, 2 pages.

\* cited by examiner

FIG. 11

BYPASS VALVE WITH A HOLLOW SHAFT AND A MEMORY METAL ALLOY SPRING

CROSS-REFERENCE TO RELATED APPLICATION

This application claims priority to United Kingdom Patent Application No. 1206826.8, filed Apr. 18, 2012, and all the benefits accruing therefrom under 35 U.S.C. §119, the contents of which in its entirety are herein incorporated by reference.

BACKGROUND

Memory metal alloy (MMA) valves may utilize one or more MMA springs for pressure relief functionality of temperature related valve movement. For instance, in some applications, in a poppet type or style of valve an MMA spring resists a pressure force provided by fluid. Pressure relief functionality, however, might not be required or might not even be possible to implement. In some applications, it may be desirable to use a poppet type or style of valve, wherein the MMA spring resists a pressure force provided by fluid.

In some instances, MMA springs are unable to exert sufficiently high levels of force, particularly when compared to wax bag technology within a similar volume. Consequently, for some applications it might not be possible to use MMA springs in conjunction with, e.g., a conventional valve head design. Using traditional design principles, an MMA spring simply cannot generate a force required to close a valve against higher fluid pressures, thereby precluding its use in high fluid pressure applications.

BRIEF SUMMARY

According to aspects of the disclosure, a valve is described. The valve may include an outer structure. The valve may include a hollow shaft that includes holes formed therein, the shaft disposed within the outer structure and translatable from a first position to a second position. The valve may include a memory metal alloy (MMA) spring coupled to the shaft and the outer structure, the MMA spring being configured to expand and move the shaft from the first position to the second position in response to a temperature of a fluid flowing into either a bypass inlet or an outlet. The valve may include a valve head coupled to the shaft and adapted to be biased within the outer structure, the valve head being configured to close the bypass inlet in the first position and to allow fluid to enter the bypass inlet in the second position, and configured to transfer fluid from the bypass inlet into the hollow shaft so that the fluid can exit the valve via the outlet.

In some embodiments, a method may comprise monitoring, within a valve comprising a memory metal alloy (MMA) spring, a hollow shaft coupled to the MMA spring and a valve head coupled to the shaft, a temperature of a fluid that enters the valve via a primary inlet and contacts the MMA spring and causing, by the MMA spring, the shaft to move from a first position to a second position when the temperature of the fluid exceeds a threshold so that at least a portion of the fluid enters a bypass inlet of the valve at the valve head, traverses at least a portion of a center axis of the shaft, and exits the valve via an outlet.

In some embodiments, a system may comprise a heat exchanger and a valve disposed in one of an inlet port and an outlet port of the heat exchanger, the valve comprising a primary inlet, a bypass inlet, and an outlet, a shaft adapted to move from a first position to a second position to provide a flow of fluid through a central axis of the shaft, a memory metal alloy (MMA) spring adapted to detect a temperature of a fluid entering the valve via the primary inlet and to cause the shaft to move from the first position to the second position when the temperature increases and exceeds a threshold, and a valve head coupled to the shaft and adapted to mate with a housing to close the bypass inlet when shaft is in the first position and to allow fluid to enter the bypass inlet when the shaft is in the second position.

Other aspects of the disclosure are described below.

BRIEF DESCRIPTION OF THE DRAWINGS

The present disclosure is illustrated by way of example and not limited in the accompanying figures in which.

DETAILED DESCRIPTION

In accordance with various aspects of the disclosure, a valve may be used to provide thermal relief and/or pressure relief to a system. The valve may include one or more springs to facilitate such relief.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities, components, and/or devices may refer to either a direct connection or an indirect connection.

Figure 1:
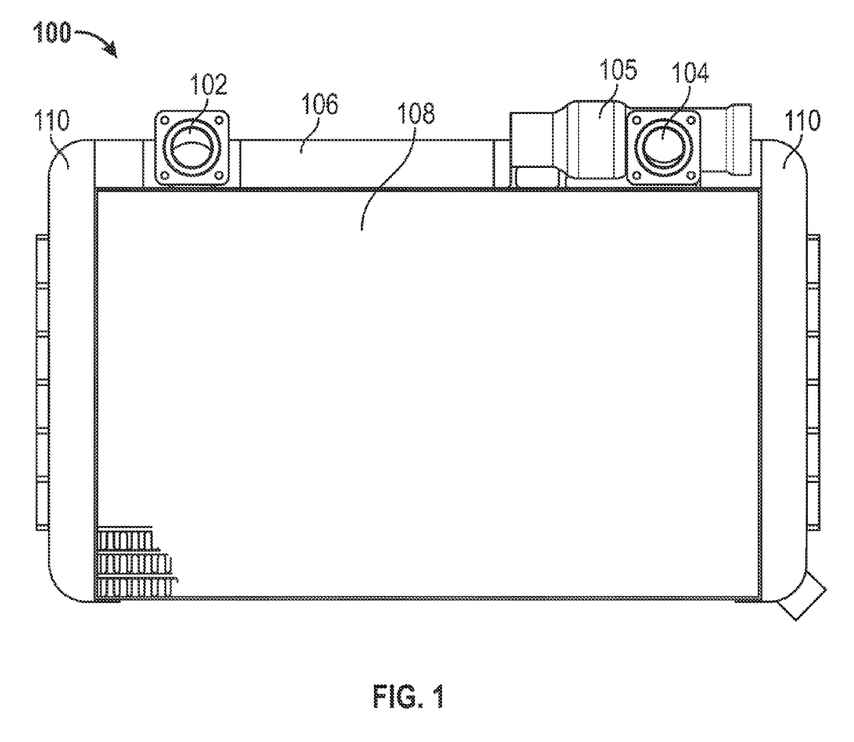
FIG. 1 illustrates an exemplary heat exchanger in accordance with one or more aspects of this disclosure.

FIG. 1 illustrates an environment in which one or more aspects of the disclosure may be implemented or practiced. Specifically, FIG. 1 illustrates a heat exchanger 100. The heat exchanger 100 may be configured to provide or support, e.g., thermal and/or pressure relief in connection with a fluid flowing through a system. For example, the heat exchanger 100 may be used in connection with, e.g., aircraft, automotive, or (gas) turbine engine industries.

The heat exchanger 100 includes an inlet 102 and an outlet 104. The inlet 102 may be configured to receive one or more fluids, such as oil. The outlet 104 may be configured to dispense or provide one or more fluids, such as oil. The inlet 102 and the outlet 104 may be fluidly coupled to one another via an inlet/outlet header tank 106, thereby allowing for a flow of fluid from the inlet 102 to the outlet 104.

In some embodiments, the heat exchanger 100 may include a heat exchange matrix 108, to which at least one or two matrix header tanks 110 may be fluidly coupled. In some embodiments, when fluid entering the inlet 102 is too hot, the fluid may be forced into the matrix 108 where the fluid may be cooled before being permitted to flow through the outlet 104. By contrast, if the fluid is cool, a large proportion of the fluid may be permitted to flow from the inlet 102, through inlet/outlet header tank 106 and exit at the outlet 104, without entering matrix 108.

In order to control the extent to which fluid is forced into matrix 108, one or more valves 105 may be inserted in heat exchanger 100. While the valve 105 is shown at the outlet port 104, it shall be understood that it could be located at the inlet port 102 in another embodiment.

Figure 2:
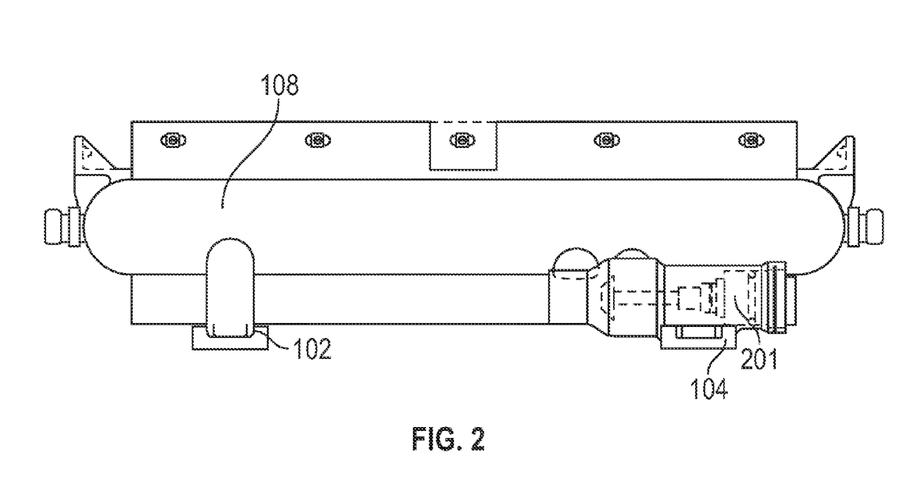
FIG. 2 illustrates an exemplary installation of a valve in accordance with one or more aspects of this disclosure.

FIG. 2 illustrates a valve assembly 201 installed into an outlet port (e.g., the outlet 104 of FIG. 1). The valve 201 is configured to allow some of the flow to travel directly from the inlet 102 to the outlet 104 in some cases. In other cases (e.g., when the fluid exceeds a certain threshold) the valve 201 causes all of the flow entering the inlet 102 to pass through the matrix 108 before it reaches the outlet 104.

It may be desirable to use a memory metal alloy (MMA) spring in a valve, such as a thermal valve. An MMA spring may be composed of one or more materials, such as nickel titanium alloys, pure or with copper, e.g., Ni—Ti or Ni—Ti—Cu. MMA springs may provide for approximately one-hundred thousand to two-hundred thousand cycles without loss of memory or performance degradation. MMA springs may provide an ability to set a transition temperature and width of a hysteresis curve. A spring rate change may be very responsive to temperature changes with a high degree of accuracy relative to other types of springs. Fluid (e.g., oil) may be permitted to flow through a valve housing. Pressure relief and displacement may be accommodated using a single spring or other mechanism such as but not limited to a mechanical, electromechanical, pneumatic, hydraulic or additional MMA device. It suffices to say that the use of MMA springs may be desirable in one or more applications, given the many benefits potentially associated with MMA springs.

Figure 3:
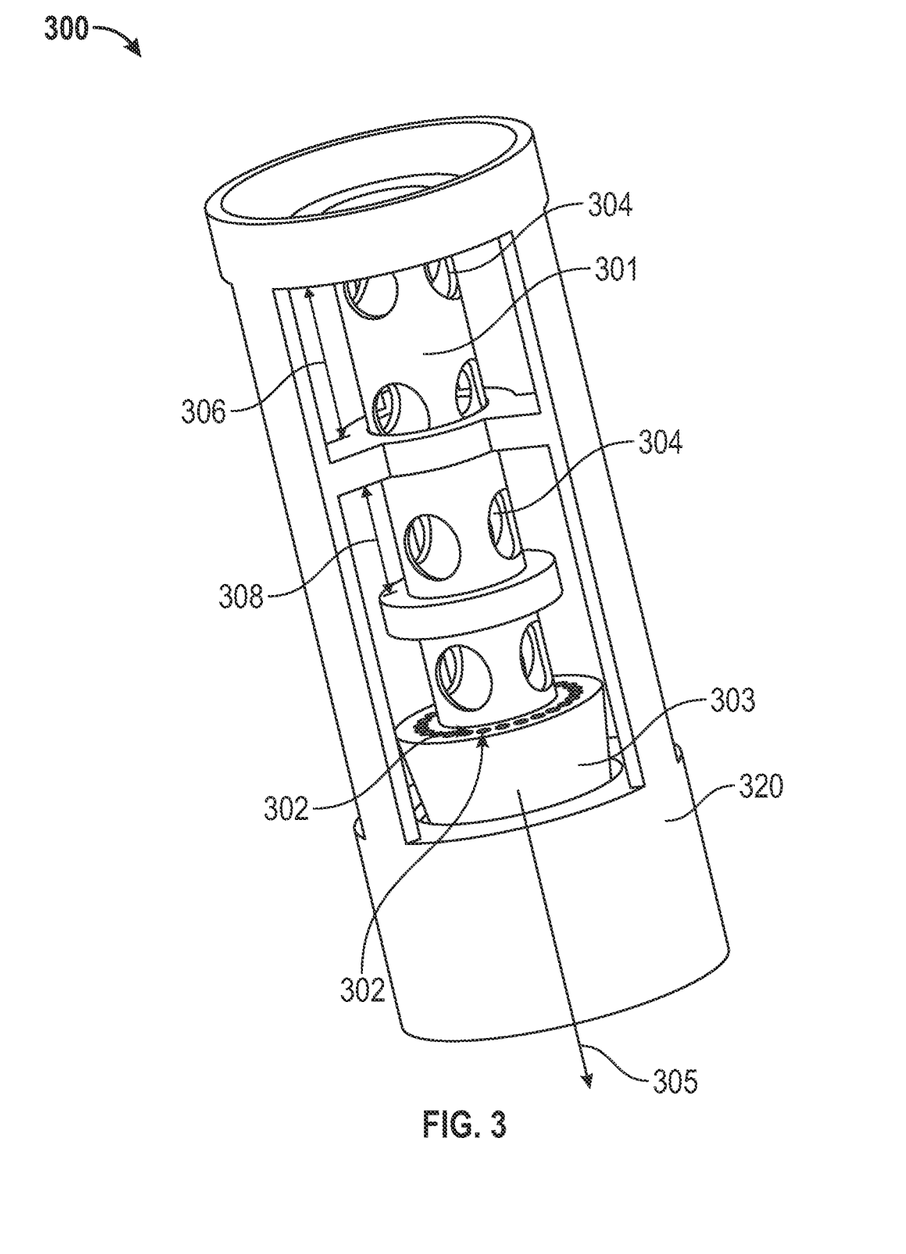
FIG. 3 illustrates an exemplary valve in accordance with one or more aspects of this disclosure.

In some embodiments, a valve according to one or more embodiments includes a shaft assembly disposed within the valve. The valve may include one or more MMA springs and/or bias springs as described further below. An embodiment of a valve or shaft assembly 300 is illustrated in FIG. 3. The assembly 300 includes a valve sleeve, a valve outer structure, or more generally, an outer structure 320. In one embodiment, the outer structure or outer portion 320 could be formed as part of a valve housing (not shown). In another embodiment, the outer structure 320 is separate from the valve housing. Regardless of how formed, the outer structure 320 carries a hollow (central) shaft 301 configured to allow fluid (e.g., oil) to flow through it. The hollow shaft 301 includes a valve head 303 coupled to an end of it. The shaft 301 and the valve head 303 are, collectively, movable within the assembly 300 in general and the outer structure 320 in particular in the direction indicated by arrow 305. The valve head 303 may include one or more holes 302 to facilitate a flow of fluid into the assembly 300. In some embodiments, the valve head 303 may be tapered. For example, the valve head 303 may be wider at a location of a plane coinciding with the location of the holes 302 and may tend to narrow from that plane as shown in FIG. 3. Using a tapered valve head 303 may reduce or minimize an axial force transmitted to one or more springs, such as an MMA spring. The shaft 301 may include one or more holes 304. The holes 304 may be arranged around an outer circumference or ring of the hollow shaft 301. The holes 304 may facilitate a flow of fluid into the assembly 300 in a region outside of the hollow shaft 301. It shall be understood, however, that these holes 304 are optional.

Also shown in FIG. 3 is a potential location or position 306 of a bias or return spring or other mechanism for this purpose such as but not limited to a mechanical, electromechanical, pneumatic, hydraulic or additional MMA device. A potential location or position 308 of an MMA spring within shaft assembly 300. The role of the bias element and MMA springs are described further below. While not visible in FIG. 3, it shall be understood that the outer portion 320 defines a valve seat into which the valve head 303 may be biased by the MMA spring.

Figure 4:
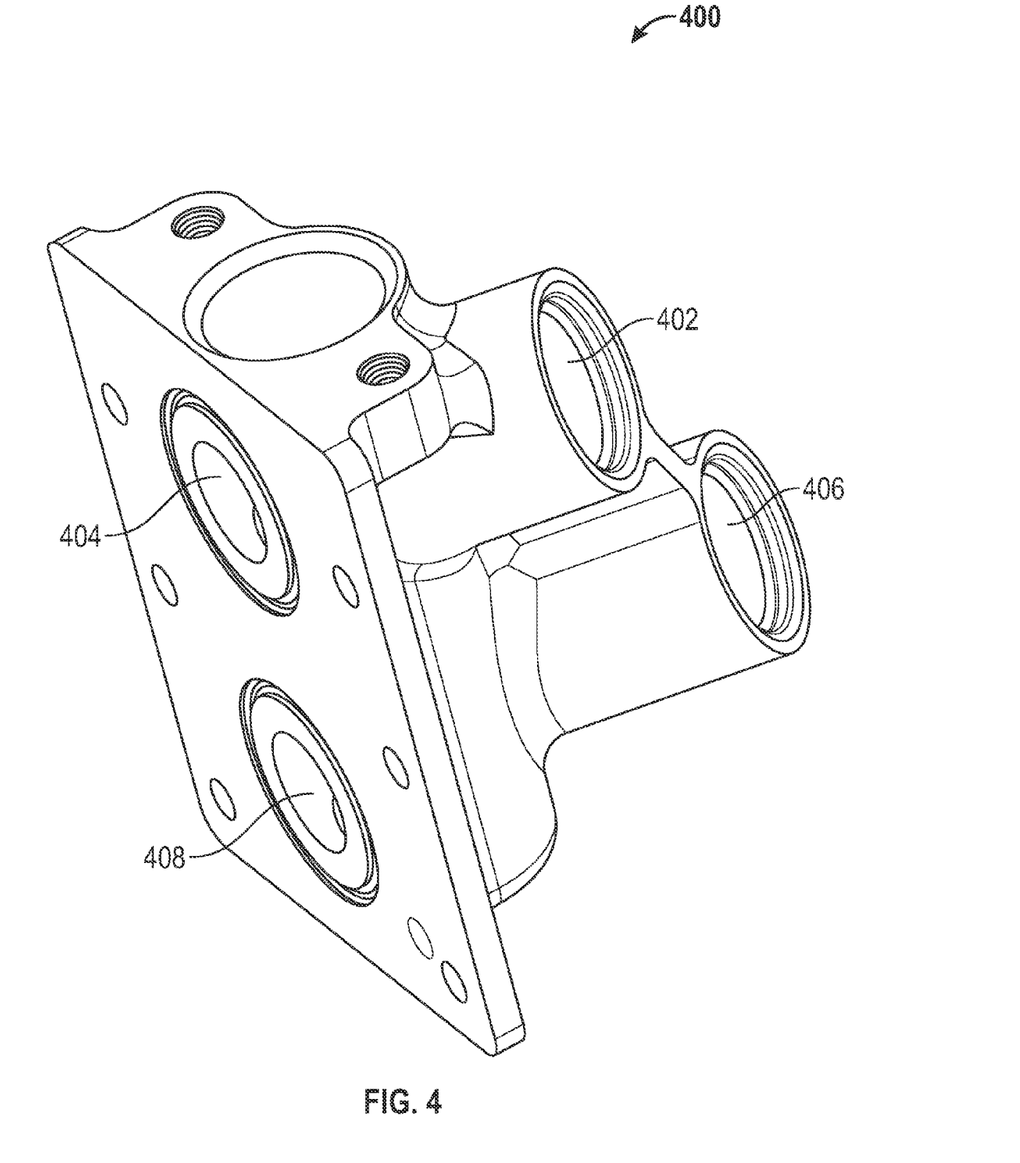
FIG. 4 illustrates an exemplary housing in accordance with one or more aspects of this disclosure.

FIG. 4 illustrates a housing 400 to be used with the assembly 300 in accordance with one or more embodiments. In some embodiments, the housing 400 may be used or associated with a heat exchanger, such as the heat exchanger 100 of FIG. 1. The housing 400 may be welded to the heat exchanger (e.g., FIG. 1) or bolted to the heat exchanger (e.g., FIG. 4).

As shown in FIG. 4, housing 400 includes an inlet 406 for receiving fluid. A portion of the fluid received at the inlet 406 may be directed to a heat exchanger (HEX) inlet port 408, and the remainder of the fluid received at the inlet 406 may be directed to an outlet 402 through (a valve included in) the housing 400. Any fluid that enters a heat exchanger (not shown in FIG. 4) via the HEX inlet port 408 may be returned to the housing via a HEX outlet port 404, and that fluid may in turn flow to the outlet 402. It shall be understood that the valve disclosed herein controls whether or not any of the fluid is allowed to bypass the HEX and proceed directly from the inlet 406 to the outlet 402.

The direction of the fluid flow described in connection with FIG. 4 is illustrative. For example, fluid may flow in a direction different from that described in connection with FIG. 4 in some embodiments. Furthermore, the designation of the inlet 406, the HEX inlet port 408, the outlet 402, and the HEX outlet port 404 in FIG. 4 is arbitrary. In some embodiments, the designations may be rearranged or different from what is shown in FIG. 4.

Figure 5:
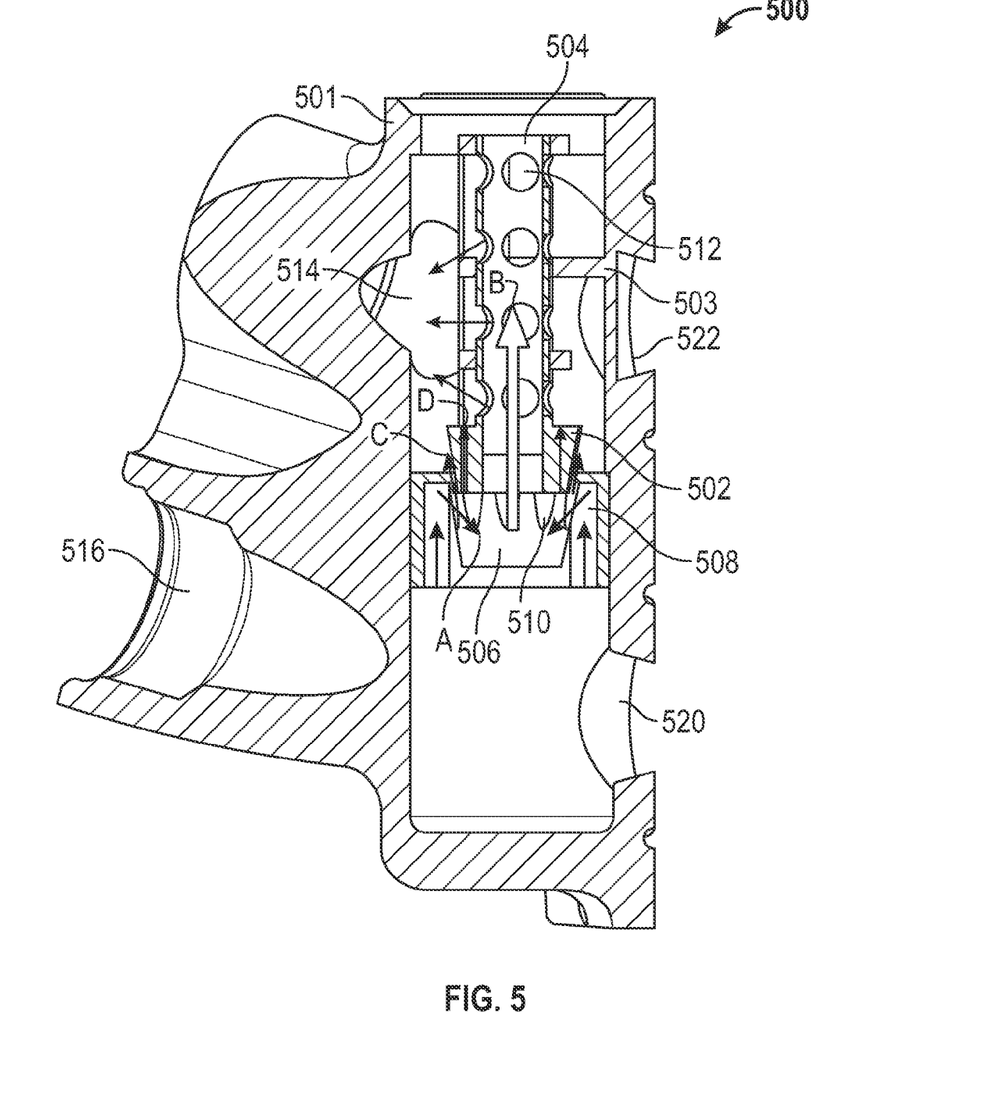
FIG. 5 illustrates an exemplary valve enclosed within a housing in accordance with one or more aspects of this disclosure.

FIG. 5 illustrates, in a partial cut-away perspective view, an assembly 500, which may be substantially similar to valve assembly 300, in an open or bypass position that is installed within a valve housing 501 (e.g., housing 400 of FIG. 4). The assembly 500 includes an outer portion 503 that carries a valve head 502 coupled to a hollow shaft 504. The assembly 500 further includes a valve seat 506 formed in the outer portion 503 that is adapted to receive the valve head 502 when it is in the closed position. Surrounding the valve seat 506 is an inlet ring 508. The inlet ring 508 includes one or more holes 510 (described in greater detail below) that allow a fluid to flow from the inlet ring 508 into the valve seat 506. The inlet ring 508 can be formed as part of the outer portion 503 as shown in FIG. 5 or could be formed in an area between the outer portion 503 and the valve housing 501.

When the valve head 502 is retracted, a fluid may travel from the inlet ring 508, through the holes 510 and into the valve seat 506 as shown by arrow A. Once in the valve seat 506, the fluid may exit in at least two manners. First, the fluid may exit by passing through an internal region of the hollow shaft 504 as shown by arrow B. In this case, the fluid exits the shaft 504 via shaft holes 512 and leaves the housing 501 via an outlet 514. Second, because the valve head 502 is not fully seated in the valve seat 506, fluid can escape in the gap between the valve head 502 and the valve seat 506 as indicated by arrow C. Lastly, and optionally, fluid in the valve seat 506 can enter the holes 302 (FIG. 3) formed in the valve head 502 and travel through the valve head 502 itself as indicated by arrow D. The relative sizes of the arrows B-D represent the relative flow volumes. In some embodiments, even when the valve head is retracted, a proportion of fluid entering assembly 500 via an inlet 516 may still be directed through the heat exchanger. For example, a proportion of the fluid may still enter a heat exchanger through a HEX inlet port 520, and that proportion of fluid (less any loss in fluid attributable to the heat exchanger) may be returned to the outlet via a HEX outlet port 522. It shall be understood that when the valve assembly 500 is in the open or bypass position, fluid in the inlet ring 508 is allowed to bypass the HEX. Accordingly, fluid that leaves the inlet 516 through the inlet ring 508 (e.g., through holes 510) may be referred to as having entered a bypass inlet. Fluid that leaves the inlet 516 through the HEX inlet port 520 may be referred to as having entered a primary inlet.

Figure 6:
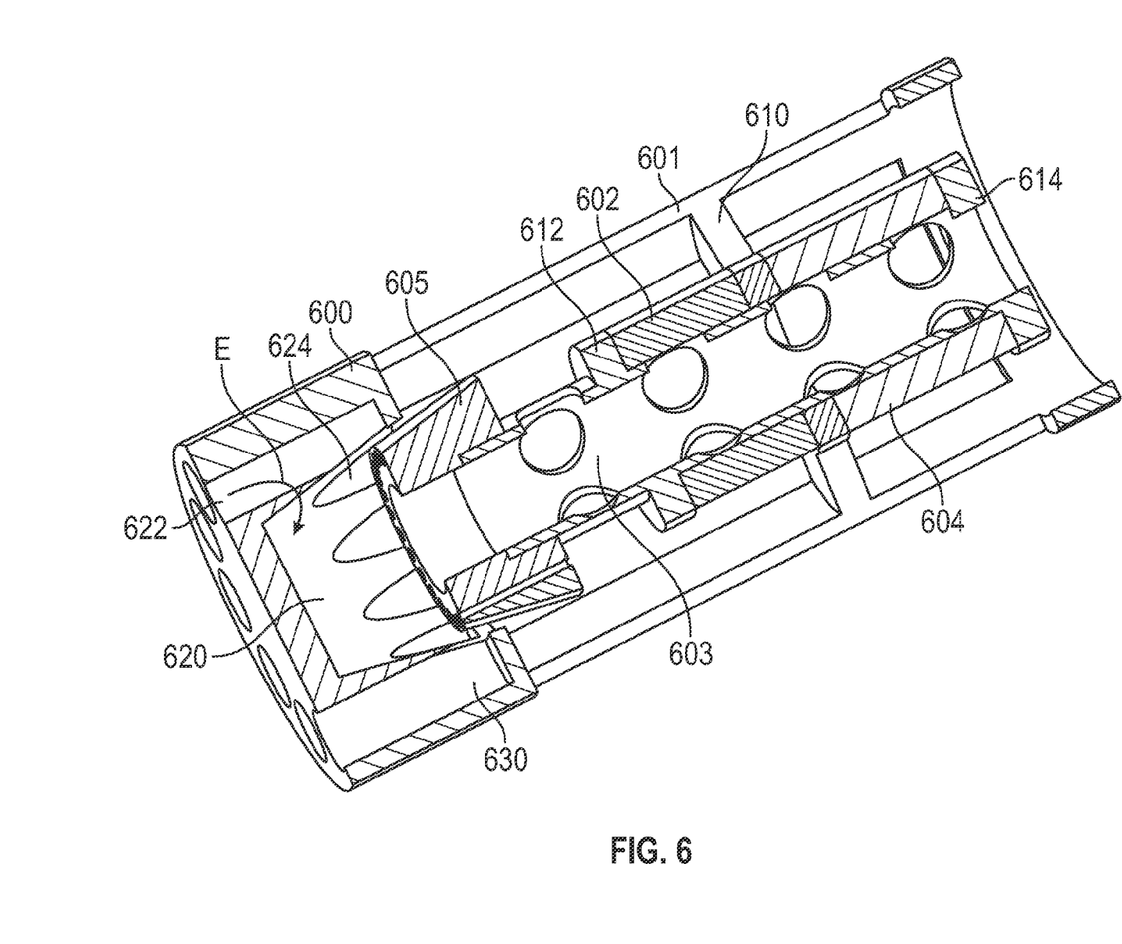
FIGS. 6-7 illustrate exemplary valves in accordance with one or more aspects of this disclosure.

FIG. 6 illustrates an assembly 600 in the open or bypass state as described in relation to FIG. 5 above. In some embodiments, reference character 600 may correspond to the outer structure 320 (e.g., a valve sleeve or valve outer structure) of FIG. 3. Similar to FIG. 5, the assembly 600 includes an outer housing 601 that carries a shaft 603 coupled to a valve head 605 in an open or bypass state. The retracted state may be the result of a state of an MMA spring 602 and/or a bias spring 604. When in the retracted state, (a larger portion of) fluid may bypass a heat exchanger coupled to the assembly 600, and flow through the assembly 600. Such a condition/state may be indicative of fluid that is relatively cold and does not need to be subjected to cooling via the heat exchanger.

In more detail, the outer housing 601 includes a spring retaining member 610 that extends radially inwardly from towards the shaft 603. Similarly, the shaft 603 includes spring retaining member 612 that extends radially outwardly from it towards the outer housing 601. The MMA spring 602 is disposed between the spring retaining members 610, 612. One of ordinary skill will realize based on the teachings herein that the location and the orientation of the spring retaining members 610, 612 can be varied without departing from the present disclosure. In operation, the temperature of a fluid contacting the MMA spring 602 can cause the MMA spring 602 to expand and, accordingly, drive the valve head 605 into the valve seat 620. One property typical of one way MMA springs 602 is that they do not contract after being expanded. As such, the assembly also includes a bias spring 604. The bias spring 604 is arranged between the spring retaining member 610 and a second spring retaining member 614 of the shaft 603. The bias spring 604 is selected such that its spring constant is substantially temperature independent and causes the shaft 603 to move to the open position illustrated in FIG. 6 when the temperature of the fluid contacting the MMA spring 602 is not sufficient to cause it to expand (or stay expanded). Of course, the relative strengths of the bias spring 604 and the MMA spring 602 can be selected to control the temperatures as which the assembly 600 moves from the open position to the closed position.

Further illustrated in FIG. 6 is an inlet ring 622 that, in this case, is formed by a plurality of inlet holes formed in the outer portion 601. The holes can pass all the way through the outer portion 601 or be formed such that they stop at an upper surface 630 as shown in FIG. 6. Regardless, the inlet ring 622 includes inlet holes 624 that fluidly couple them to the valve seat 620 formed in the outer housing 601. In the open state, the valve head 605 does not block the inlet holes 624 and fluid is allowed to flow from the inlet ring 622 into the valve seat 620 as shown by arrow E and through the assembly 600 in the manner described above.

Figure 7:
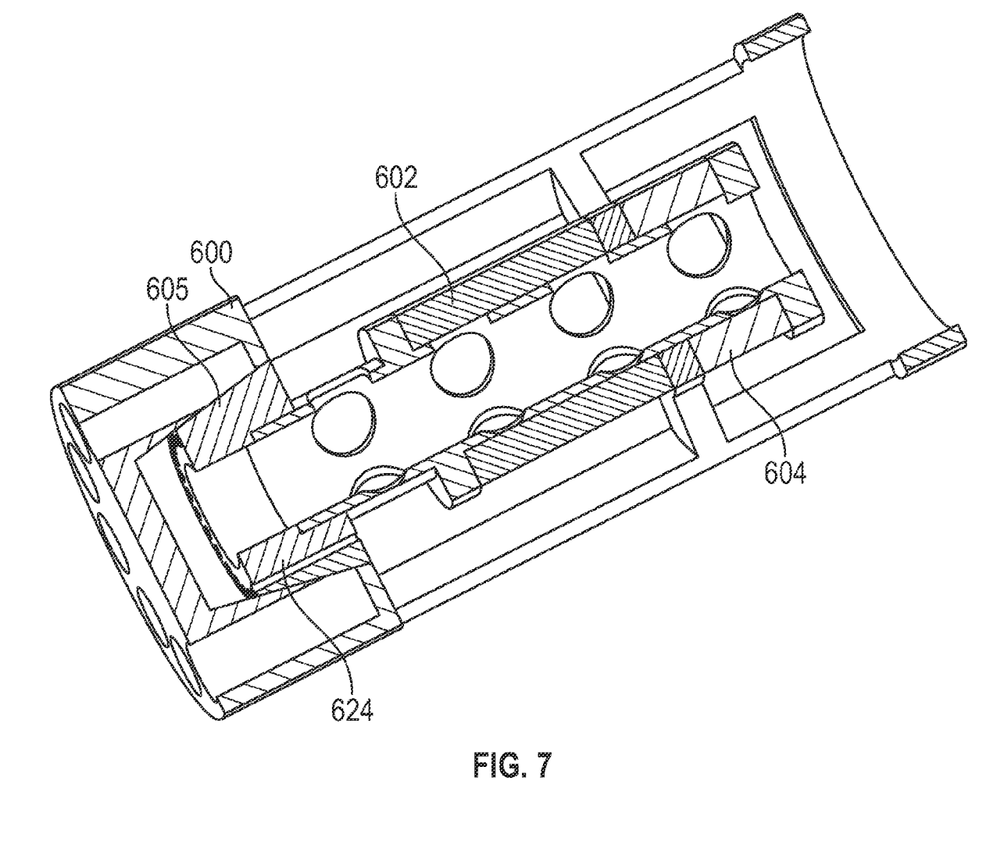

FIG. 7 illustrates the assembly 600 in the extended or closed state. In this state, the MMA spring 602 has been extended and the valve head 605 closes inlet holes 624. When in the extended state, (a larger portion of) fluid may be directed to a heat exchanger coupled to assembly 600. Such a condition/state may be indicative of fluid that is relatively hot and needs to be subjected to cooling via the heat exchanger.

A comparison of FIGS. 6 and 7 serves to demonstrate the difference in the state of the MMA 602 and bias springs 604 as a function of the temperature of the fluid. When the fluid is cold or cool, the MMA spring 602 is relatively compressed and the bias spring is relatively uncompressed as shown in FIG. 6. Conversely, when the fluid is hot or warm, the MMA spring 602 is relatively uncompressed and the bias spring 604 is relatively compressed as shown in FIG. 7.

In some embodiments, it may be desirable to provide pressure relief in combination with thermal regulation in a common valve. Pressure relief may be provided to alleviate a buildup of pressure, in order to prevent system, device, or component failure or damage. Use of a common valve for both temperature regulation and pressure relief may remove the need for a separate pressure relief valve. In some embodiments, pressure relief may be activated or engaged when a system exceeds a maximum or threshold pressure with the valve in either or both the open or closed positions.

Figure 8:
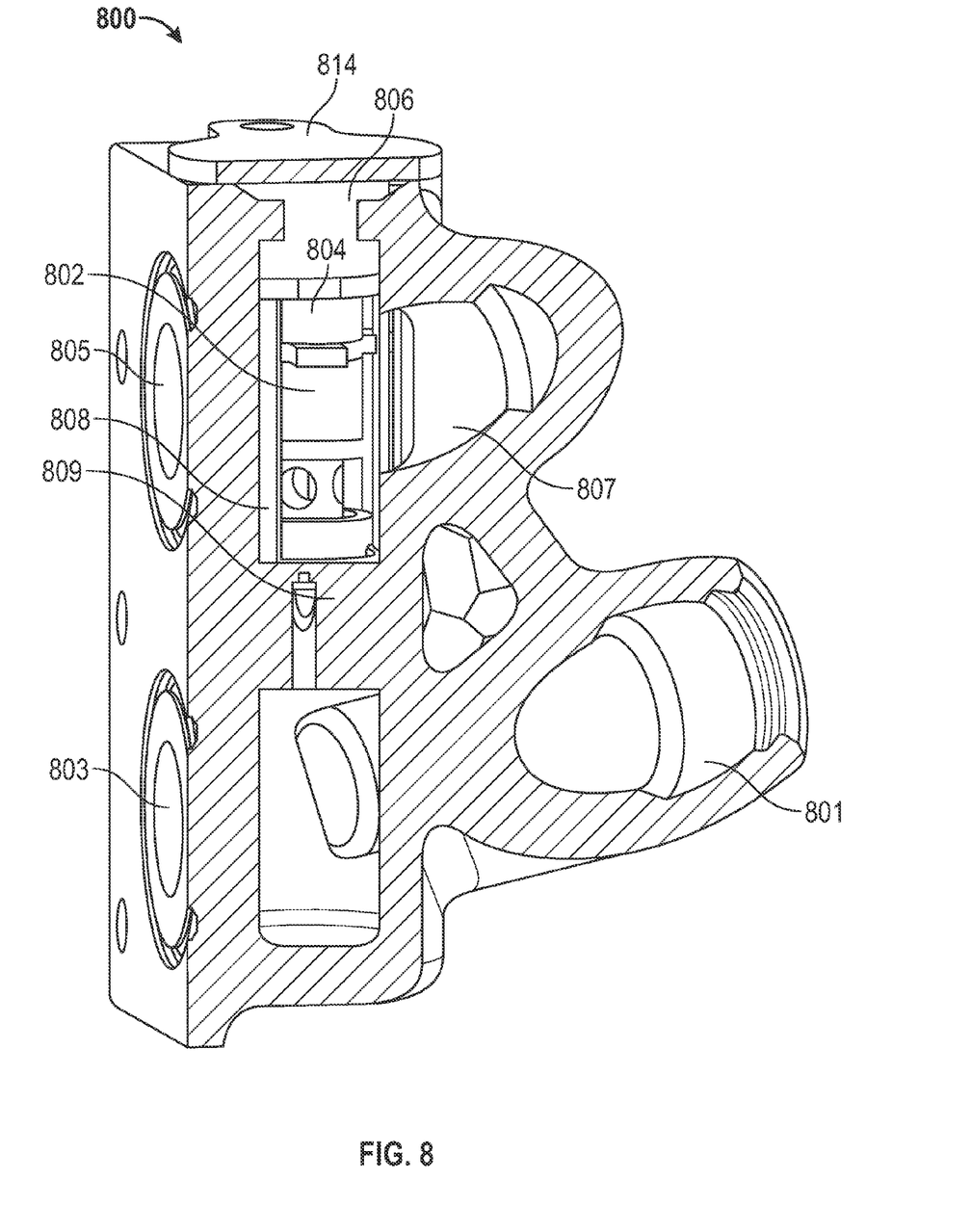
FIG. 8 illustrates an exemplary valve enclosed within a housing in accordance with one or more aspects of this disclosure.

FIG. 8 illustrates an assembly 800 into which a dual purpose valve assembly 809 may be located. Many of the labels shown in FIG. 8 (e.g., inlet 801, heat exchanger inlet port 803, heat exchanger outlet port 805, and outlet 807) may be analogous to their counterparts described previously in connection with FIGS. 1, 4, and 5, and so, a complete (re)description of their role is omitted here for the sake of brevity. The valve assembly 809 includes all of the pieces described above (e.g., MMA spring 802, bias spring 804 and an outer structure or valve sleeve). MMA spring 802 and bias spring 804 may be configured to provide thermal relief as previously described herein.

Figure 9:
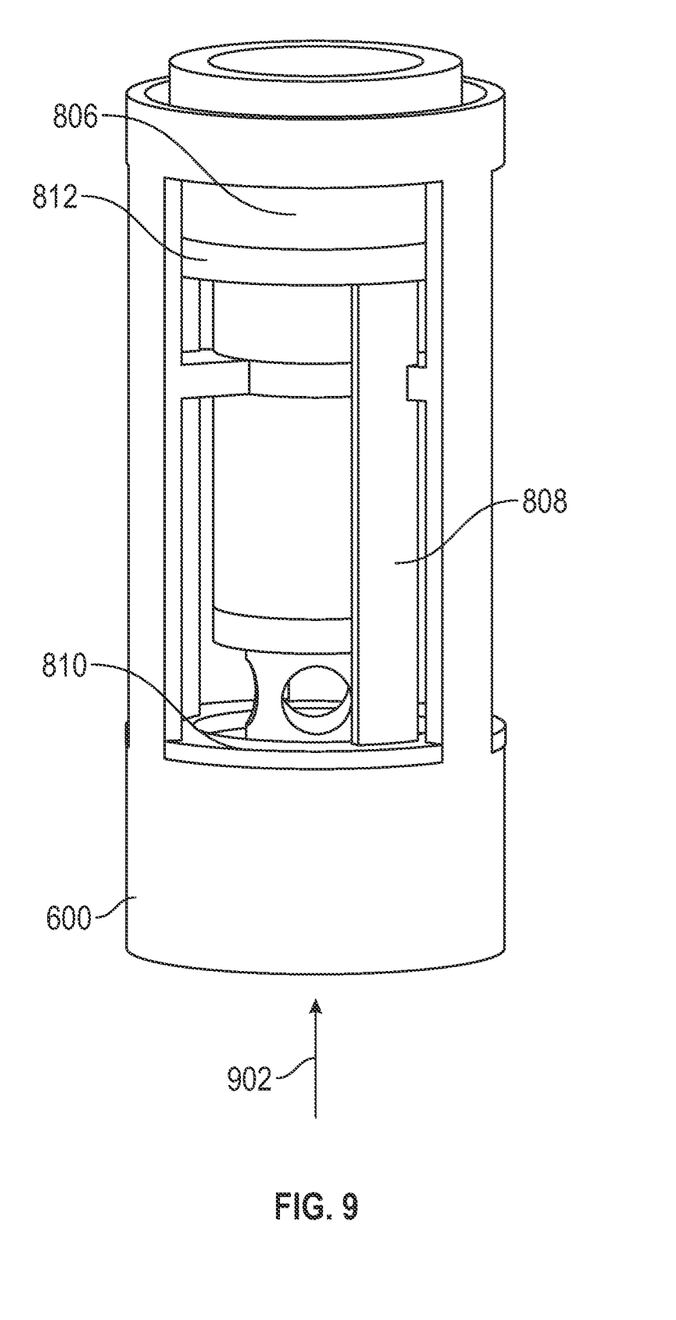
FIG. 9 illustrates a valve assembly in accordance with one or more aspects of this disclosure.

The assembly 800 may include a pressure relief spring 806 that may be adapted to provide pressure relief in combination with a relief portion 808. The illustrated relief portion 808 provides for rigid connection between a first end 810 and a second end 812 thereof, as shown in FIG. 9. The first end 810 (as described further below) is in fluid contact with fluid in the inlet ring and the second end is in operative contact with the relief spring 806. The relief spring 806 is disposed between the second end 812 and fixed portion of a valve cap 814. The valve cap 814 may be configured to hold the pressure relief spring 806 and valve assembly 809 within the assembly 800 or a housing associated therewith.

Figure 10:
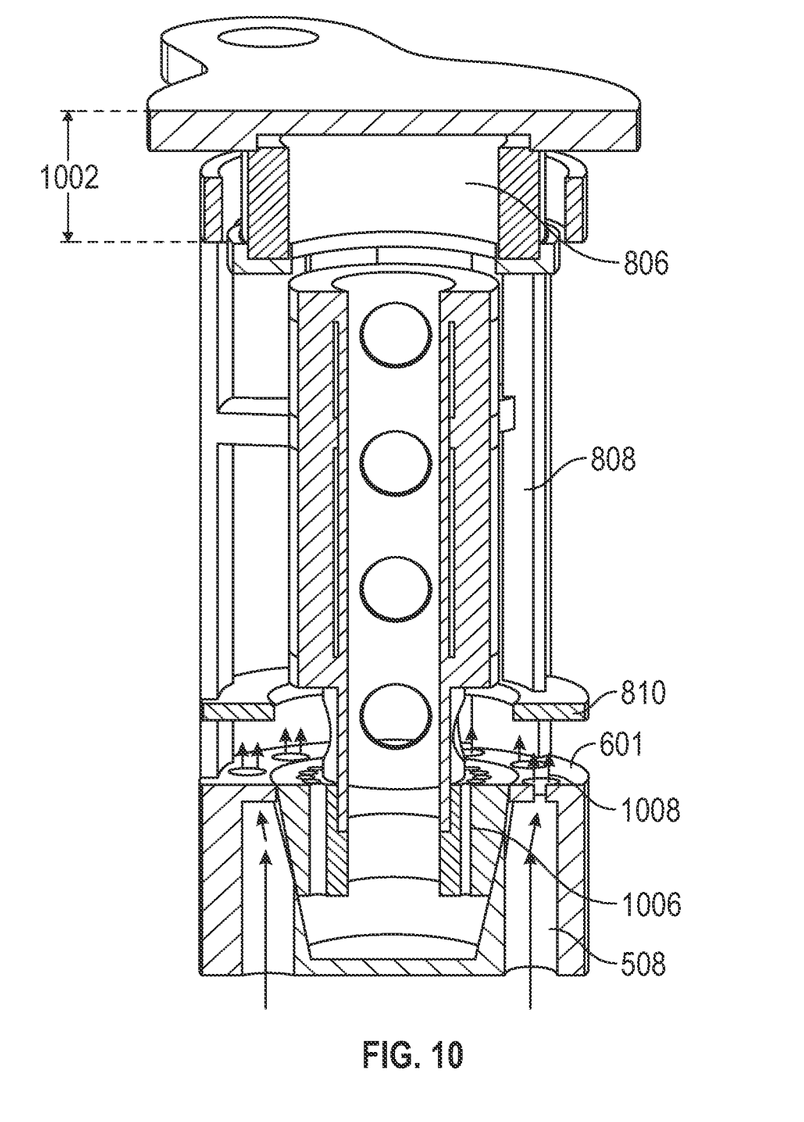
FIG. 10 illustrates an exemplary valve enclosed within a housing in accordance with one or more aspects of this disclosure.

FIG. 9 illustrates that a valve in a closed position if the force created by the pressure of the fluid (indicated by arrow 902 in FIG. 9) is relatively small. In this manner, the force created by the fluid on first end 810 of relief portion 808 might be relatively small, such that relief portion 808 might not compress relief spring 806 to any great degree. Conversely, as shown in FIG. 10, a force created by the pressure associated with the fluid may be sufficiently high to compress pressure relief spring 806, such that the valve may be in an open position. Specifically, when the force created by the pressure associated with the fluid is sufficiently high, the fluid may flow through the inlet ring 508, and press against the first end 810 of the relief portion 808, which may cause pressure relief spring 806 to compress (or compress even further). Compression of the spring allows for holes 1008 to "open" when the first end 810 moves away from the outer housing 601. When the valve is in this open position, a greater portion of the fluid may pass through the valve relative to the portion of fluid that flows through, e.g., an exchanger coupled to or associated with the valve.

In the embodiment of FIG. 10, pressure relief spring 806 is shown as being located in a position or chamber 1002. Such an orientation or configuration may be used when the valve is located with the MMA spring sensing the outlet temperature of an exchanger. In some embodiments, the pressure relief spring 806 may (instead) be positioned between the underside of the second end 812 in FIG. 9 and the spring retaining member 610 in FIG. 6. For example, the pressure relief spring 806 may be relocated to when the valve is located with the MMA spring sensing the inlet temperature of an exchanger.

The various components and devices described above are illustrative. In some embodiments, some of the component or devices (or portions thereof) may be optional. In some embodiments, additional devices or components may be included. In some embodiments, the devices and components may be rearranged or reordered relative to the configurations specifically depicted in the figures.

Figure 11:
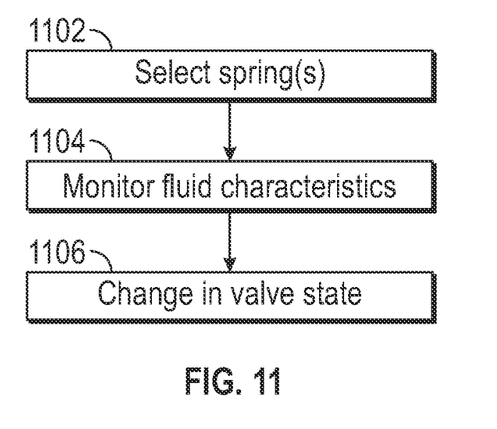
FIG. 11 illustrates an exemplary method in accordance with one or more aspects of this disclosure.

FIG. 11 illustrates a method in accordance with one or more aspects of this disclosure. The method of FIG. 11 may be used in connection with one or more components, devices, or systems, such as those described herein. The method of FIG. 11 may be used to provide, e.g., thermal and/or pressure relief.

In 1102, one or more springs may be selected. For example, one or more MMA springs, bias springs, and pressure relief springs may be selected for use in a valve. The selection of the spring(s) may be based at least in part on the application or environment in which the valve is to be implemented. As part of 1102, the valve may be manufactured or assembled. As part of 1102, the valve may be installed at an inlet or outlet side of an associated exchanger.

In 1104, the valve (or spring(s) associated therewith) may monitor for one or more characteristics or properties of a fluid. For example, the spring(s) may monitor the temperature of the fluid and/or a force resulting from a pressure associated with the fluid.

In 1106, a change in the valve state may be triggered. For example, if the monitoring associated with step 1104 indicates that the valve, when initially open, needs to be closed, one or more of the springs may act to close the valve. Similarly, if the monitoring associated with 1104 indicates that the valve, when initially closed, needs to be opened, one or more of the springs may act to open the valve. More generally, the valve (or more specifically, a shaft associated therewith) may be translated from a first position to a second position based on the monitored characteristics of 1104. The characteristics may be compared to one or more thresholds to determine whether to alter or change a state of the valve.

The method of FIG. 11 is illustrative. In some embodiments, one or more of the steps (or portions thereof) may be optional. In some embodiments, additional steps not shown may be included. In some embodiments, the sequence or order of execution of the steps may be different from what is shown in FIG. 11.

The relative terms for temperature (e.g., cold, cool, hot, and warm), pressure (e.g., large, small, etc.), and the relative states of a spring (e.g., compressed or uncompressed) as used herein may be based on a given application in which a valve is implemented. For example, a spring with associated properties or characteristics may be selected by a skilled artisan based on the safe/acceptable and/or dangerous/unacceptable temperature and/or pressure ranges of the application. In this manner, an appropriate spring may be selected to insure against system or component failure/damage.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations. Aspects of the disclosure may be directed to one or more systems, apparatuses, and methods.

Aspects of the disclosure may be tied to particular machines. For example, in some embodiments a unit (e.g., a valve) may include one or more components, such as a spring, that may monitor a characteristic of a fluid and selectively open or close a valve in response to the monitoring. Aspects of the disclosure may help to reduce the probability of component, device or system failure/damage.

Aspects of the disclosure may transform an article into a different state or thing. For example, fluid may selectively flow through a valve based on a state or position associated with the valve. For example, the valve may be opened to provide thermal and/or pressure relief. Furthermore, the thermal and pressure relief may be decoupled from one another in some embodiments.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A valve assembly disposed in a housing, the valve assembly having a primary inlet, a bypass inlet, and an outlet, the valve assembly comprising:
   an outer portion;
   a hollow shaft disposed within the outer portion and translatable from a first position to a second position;
   a memory metal alloy (MMA) spring coupled to the shaft and the outer portion, the MMA spring being configured to expand and move the shaft from the first position to the second position in response to a temperature of a fluid flow at the bypass inlet or the outlet;
   a valve head coupled to the shaft and adapted to be biased within the outer portion, the valve head being configured to close the bypass inlet in the first position and to allow fluid to enter the bypass inlet in the second position, and configured to transfer fluid from the bypass inlet into the hollow shaft so that the fluid can exit the valve via the outlet, wherein the valve head includes a plurality of valve head holes circumferentially disposed around the hollow shaft and formed axially through the valve head.

2. The valve assembly of claim 1, further comprising:
a bias spring coupled to the shaft and adapted to apply a restorative pressure to the shaft and hence to the MMA spring.

3. The valve assembly of claim 1, wherein the valve head is a tapered valve head.

4. The valve assembly of claim 1, further comprising:
a pressure relief mechanism adapted to provide pressure relief independent of thermal relief provided by the MMA spring.

5. The valve assembly of claim 4, wherein the pressure relief mechanism is adapted to provide pressure relief when the shaft is in the first position.

6. The valve assembly of claim 4, wherein the pressure relief mechanism is installed within the housing and/or the valve.

\* \* \* \* \*